s009690949B1

United States Patent
Diorio et al.

(10) Patent No.: US 9,690,949 B1
(45) Date of Patent: Jun. 27, 2017

(54) PROXY-BASED READER AUTHENTICATION BY TRUSTED AUTHORITY

(71) Applicant: Impinj, Inc., Seattle, WA (US)

(72) Inventors: Christopher J. Diorio, Shoreline, WA (US); Scott A. Cooper, Seattle, WA (US); Matthew Robshaw, Seattle, WA (US)

(73) Assignee: IMPINJ, INC., Seattle, WA (US)

( * ) Notice: Subject to any disclaimer, the term of this patent is extended or adjusted under 35 U.S.C. 154(b) by 80 days.

(21) Appl. No.: 14/444,854

(22) Filed: Jul. 28, 2014

Related U.S. Application Data

(63) Continuation-in-part of application No. 13/396,889, filed on Feb. 15, 2012, now Pat. No. 8,866,594.

(51) Int. Cl.
| | |
|---|---|
| *H04Q 5/22* | (2006.01) |
| *G06F 21/62* | (2013.01) |
| *G06K 7/00* | (2006.01) |
| *H04L 9/32* | (2006.01) |

(52) U.S. Cl.
CPC .............. *G06F 21/62* (2013.01); *G06K 7/00* (2013.01); *H04L 9/321* (2013.01); *G06F 2221/2115* (2013.01)

(58) Field of Classification Search
CPC ......... G06F 21/6254; G06F 2221/2115; H04L 9/321
USPC ....................................................... 340/10.4
See application file for complete search history.

(56) References Cited

U.S. PATENT DOCUMENTS

| | | | | |
|---|---|---|---|---|
| 7,273,181 | B2* | 9/2007 | White | G06F 21/606 235/486 |
| 7,312,707 | B1* | 12/2007 | Bishop | G06Q 20/00 340/5.52 |
| 8,866,594 | B1* | 10/2014 | Diorio | G06K 7/10297 340/10.42 |
| 2005/0289061 | A1 | 12/2005 | Kulakowski et al. | |
| 2007/0069852 | A1* | 3/2007 | Mo | H04L 9/3271 340/5.1 |
| 2009/0023474 | A1* | 1/2009 | Luo | G06Q 20/32 455/557 |
| 2009/0045917 | A1* | 2/2009 | Volpi | G01S 13/66 340/10.1 |
| 2010/0127822 | A1 | 5/2010 | Devadas | |
| 2012/0268250 | A1* | 10/2012 | Kaufman | H04W 4/008 340/10.1 |

OTHER PUBLICATIONS

Office Action received for U.S. Appl. No. 14/341,401, mailed Jun. 22, 2015 and filed Jul. 25, 2014.

(Continued)

*Primary Examiner* — Vernal Brown
(74) *Attorney, Agent, or Firm* — Turk IP Law, LLC

(57) ABSTRACT

A Radio Frequency Identification (RFID) system including an RFID reader and a reader proxy authenticates itself to a verification authority. The proxy receives a proxy challenge from a verification authority and determines a proxy response based on the proxy challenge and a proxy key known to the proxy. The proxy response is then sent to the verification authority along with an identifier for the reader. The reader then authenticates an RFID tag by sending a tag response to the verification authority, which determines whether the reader is authentic based on the authenticity of the proxy response.

20 Claims, 16 Drawing Sheets

(56) References Cited

OTHER PUBLICATIONS

Final Office Action received for U.S. Appl. No. 14/341,401, mailed Jul. 17, 2015 and filed Jul. 25, 2014.
Final Office Action received for Application No. 14/341,401, mailed Jul. 17, 2015 and filed on Jul. 25, 2014.

* cited by examiner

SIGNAL PATH DURING R→T

SIGNAL PATH DURING T→R

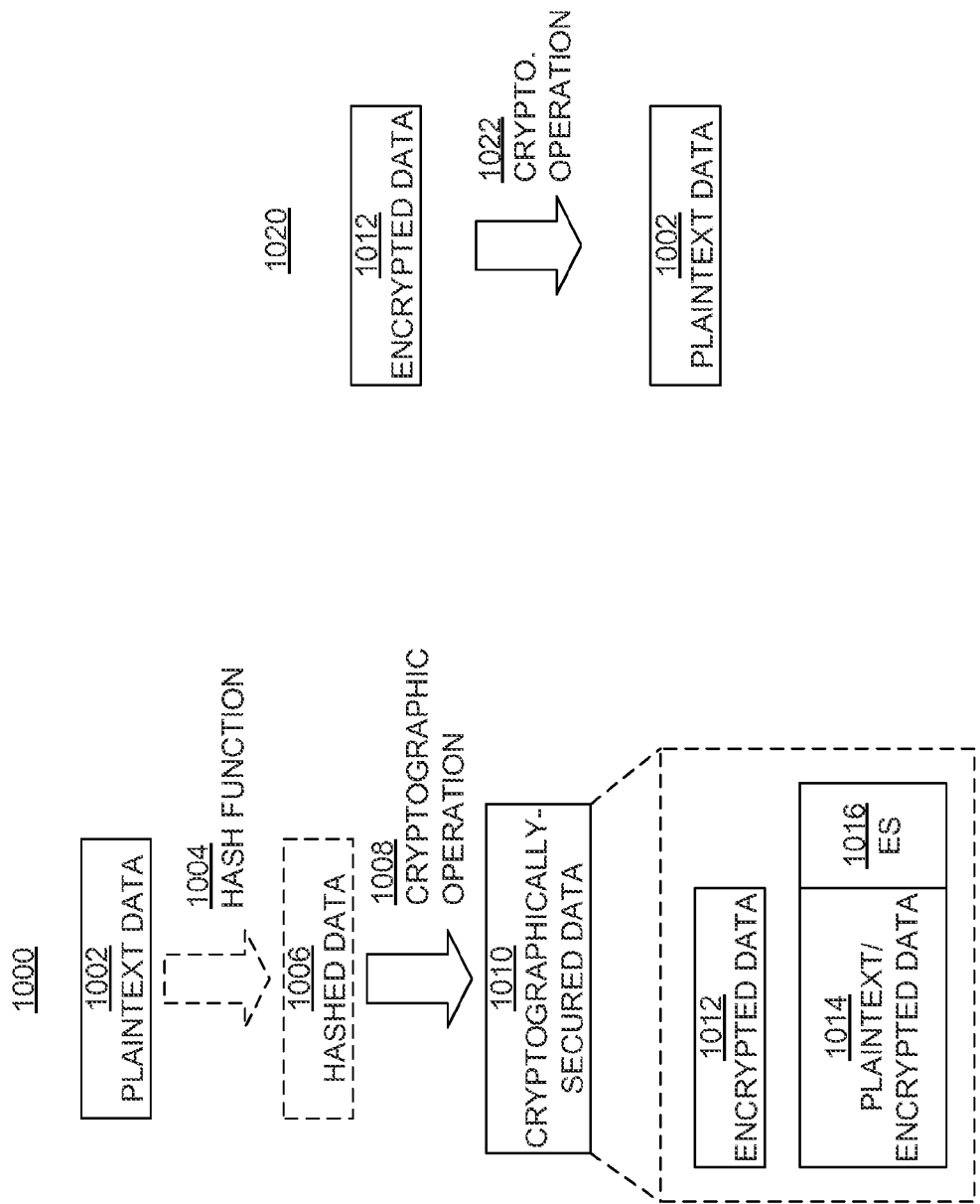

PROXY-BASED READER AUTHENTICATION BY TRUSTED AUTHORITY

CROSS REFERENCE TO RELATED APPLICATIONS

This application is a continuation-in-part of U.S. patent application Ser. No. 13/396,889 filed on Feb. 15, 2012. The disclosures of this patent application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit. However, these commercial applications are loathe to adopt anticounterfeiting systems that require password or key distribution, because securely managing and distributing passwords or keys among global trading partners is difficult.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments are directed to RFID tag authentication. An RFID reader authenticates an RFID tag containing a key by challenging the tag with a challenge. The reader receives one or more responses from the tag including an identifier and an answer to the challenge and sends a message including the received identifier, the challenge, and the answer to a verification authority. The verification authority checks the authenticity of the tag's responses and transmits a reply to the reader. The reply includes an electronic signature from the verification authority. The reader validates the verification authority's reply by checking the electronic signature. In some embodiments the verification authority also (or instead) transmits a notification including an electronic signature to a designated party if the tag's responses are incorrect.

Some embodiments are directed to RFID reader authentication using a reader proxy. In these embodiments, the reader proxy is coupled to one or more RFID readers. The reader proxy receives a challenge from a verification authority. The reader proxy determines a response based at least on the challenge and a key known to the proxy. The reader proxy then transmits the system response to the verification authority. The verification authority then verifies the authenticity of the reader proxy and optionally notifies the reader proxy, a reader coupled to the reader proxy, and/or a designated party.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 10A is a flow diagram illustrating the generation of cryptographically-secured data.

FIG. 10B is a flow diagram illustrating data recovery from encrypted data.

DETAILED DESCRIPTION

Figure 1:
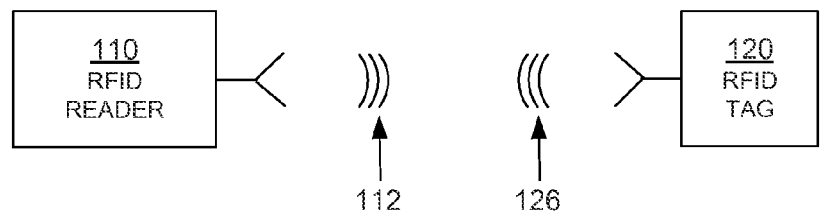
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

In some applications, RFID systems are called upon to ensure the authenticity of an item to which a tag is attached. The RFID tag may include an identifier (ID) such as but not limited to a tag identifier (TID), key identifier (KID), unique item identifier (UII), electronic product code (EPC), or a serialized trade identification number (SGTIN). In typical applications each individual RFID tag or group of tags also will contain a secret or key, which is typically not readable by an RFID reader but is known to a verification authority. The verification authority can determine which key a particular tag employs by using the ID as a table lookup or input to an algorithmic key generator.

To authenticate a tag, the reader interrogates the tag to determine the tag's ID, challenges the tag with a random number or string, receives a response from the tag, and then sends the ID, challenge, and response to the verification authority. In some applications each individual RFID tag or group of tags will contain a distinct key, and the verification authority can determine which key a particular tag employs by using the ID as a table lookup or input to an algorithmic key generator. The tag computes its response from at least the challenge and the key, typically using a cryptographic algorithm. For example, the tag may use a symmetric cryptographic algorithm, such as the Advanced Encryption Standard (AES), or an asymmetric or public key cryptographic algorithm, such as the Rivest/Shamir/Adleman (RSA) algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its ID and response for the verification authority to determine the tag-generated randomness algorithmically. In some applications, to further enhance security, the tag may encrypt its tag-generated randomness in an Initial Value (IV) and send the IV to the reader for relaying to the verification authority. In yet other applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

In some applications the verification authority may have a need to authenticate the reader that is itself attempting to authenticate a tag. For an example why, suppose the converse, that the verification authority accepted tag-authentication requests from any reader. A counterfeiter could then manufacture counterfeit tags and, prior to releasing the tags into the field, test them by configuring an illegitimate reader to send a counterfeit tag ID, challenge and response to the verification authority and thereby ascertain whether the verification authority accepts the counterfeit tags. To prevent counterfeiters from this and other potential abuses, the verification authority may choose to require that the reader authenticate itself prior to responding.

Accordingly, embodiments are directed to authenticating RFID tags, RFID readers, and responses from a verification authority. An RFID tag, reader, or proxy for the reader knows a secret, also known as a key, which is known to the verification authority. An RFID reader authenticates an RFID tag by sending a tag identifier, a tag challenge, and a tag response to the tag challenge (computed by the tag based on its secret) to the verification authority for confirmation or refutation. Similarly, the RFID reader may authenticate itself indirectly through the proxy or directly by having its identifier and a challenge response sent to the verification authority for confirmation or refutation. The challenge response may be computed by the reader or by the reader proxy, and is based on a reader/proxy secret and a received challenge. The reader/proxy authentication may occur before or simultaneously with a tag authentication. When the verification authority responds, it electronically signs its response so that the receiving entity can validate the signed response and therefore confirm that it did originate from the verification authority and is unaltered.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
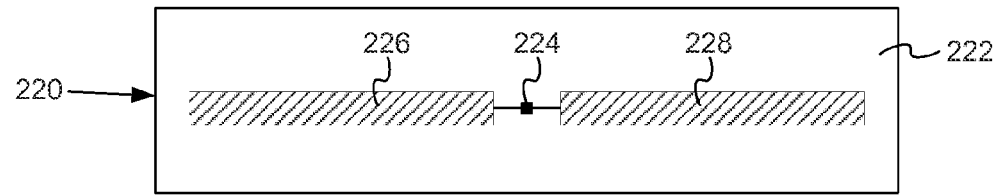
FIG. 2 is a diagram showing components of a passive RFID tag, such as a tag that can be used in the system of FIG. 1.
Figure 2:
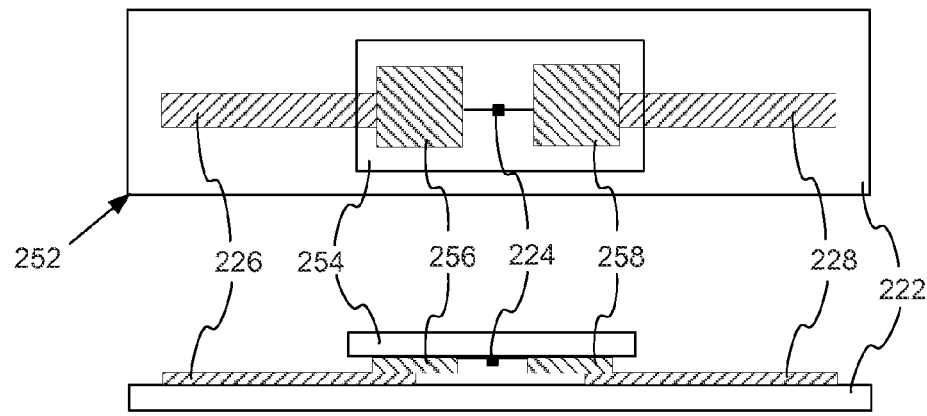
Figure 2:
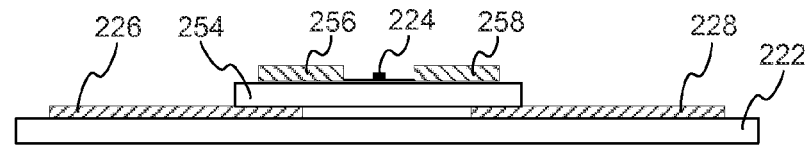

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224.

Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
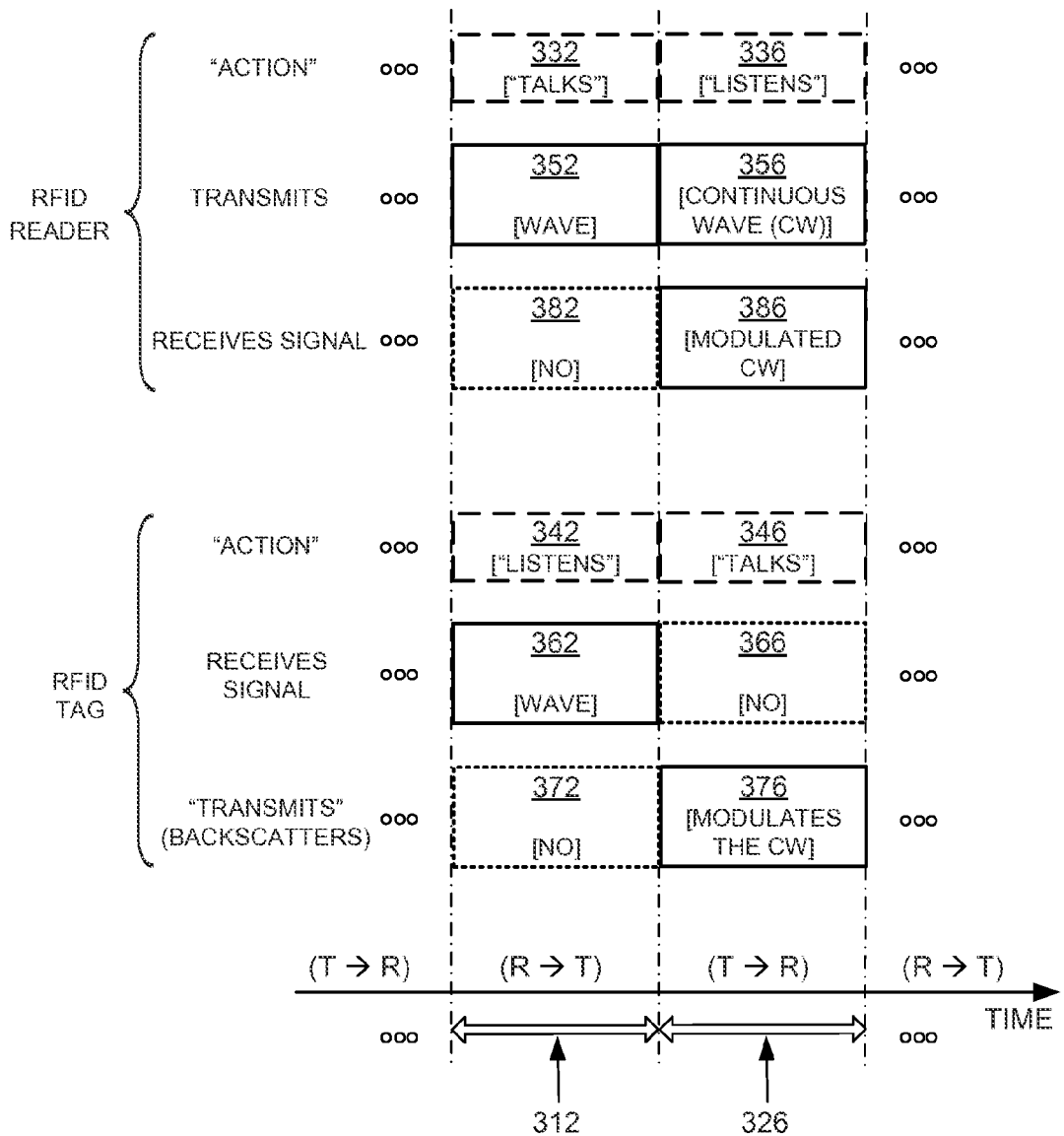
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
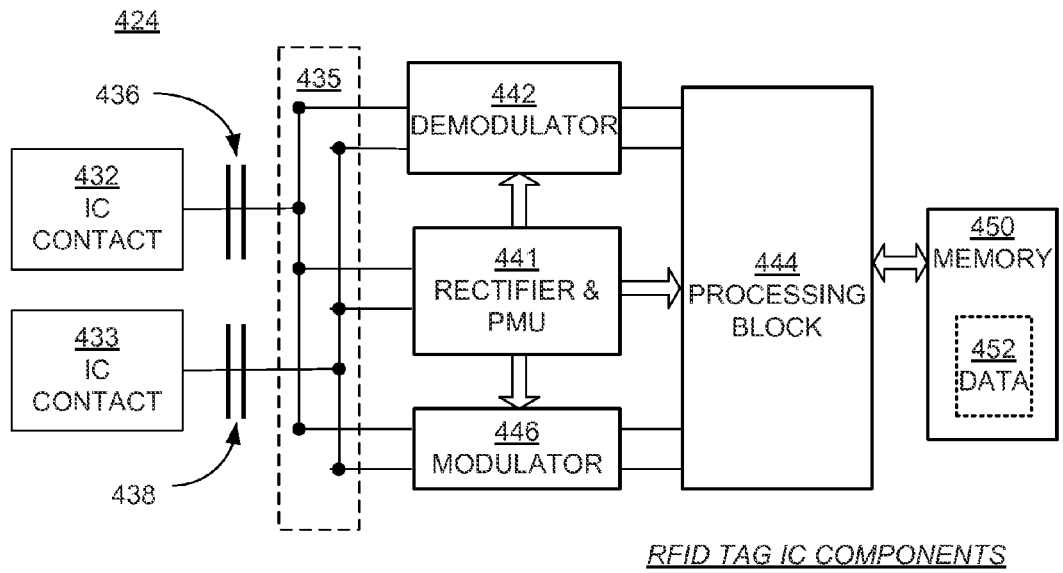
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
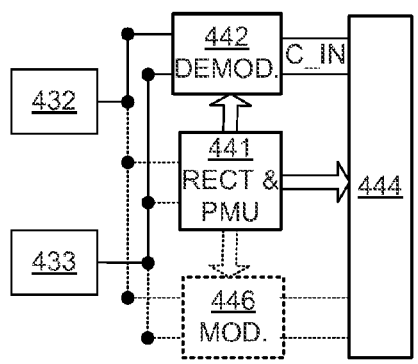
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
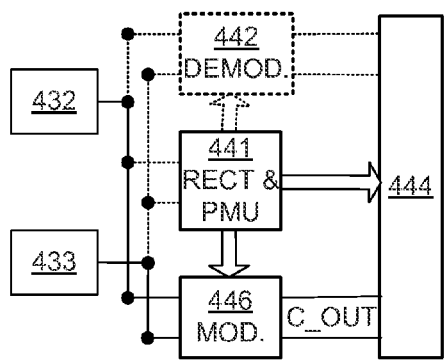

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
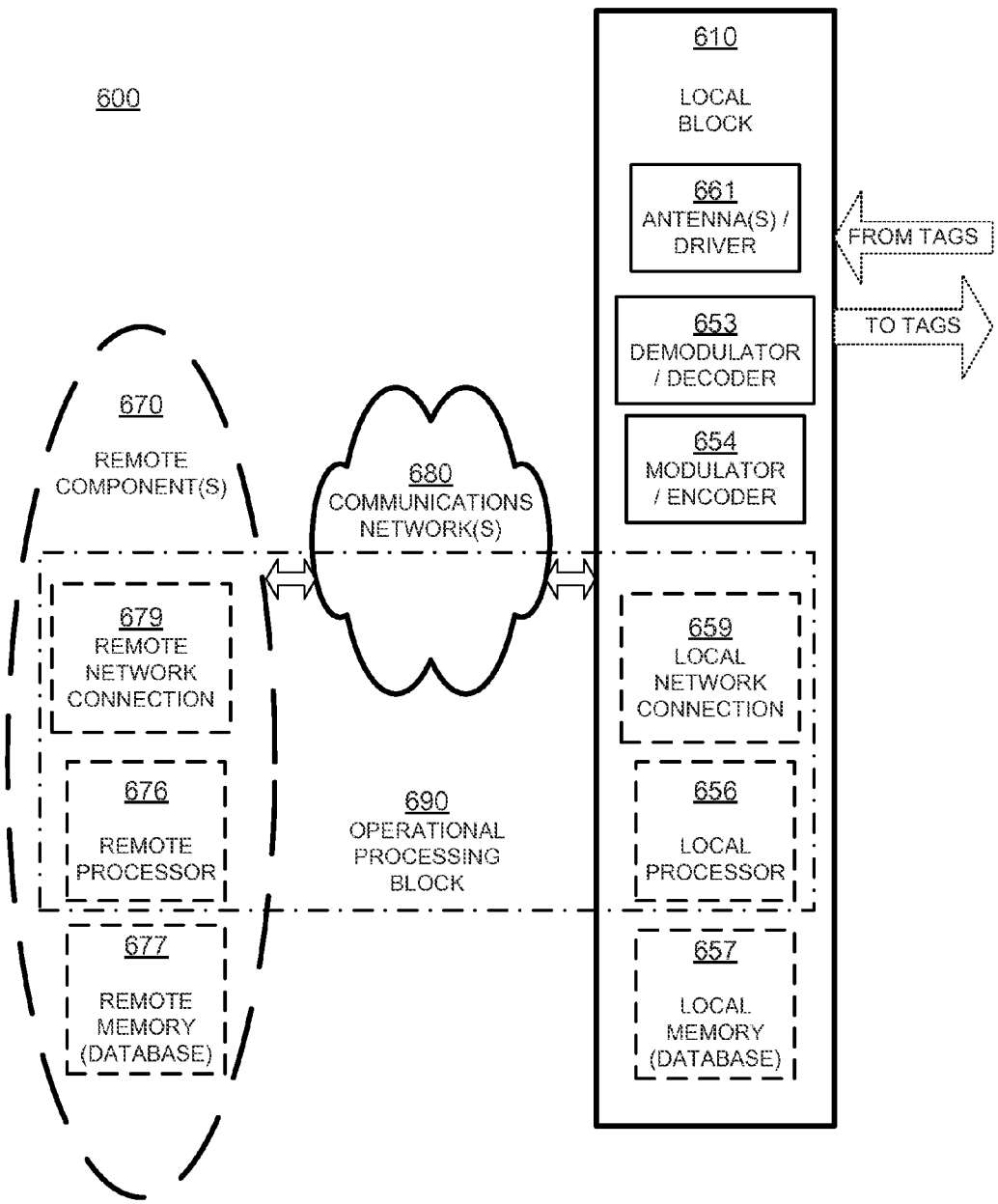
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

Local block 610 is responsible for communicating with tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RF wave that is to be transmitted to tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to the EPC, TID, instructions and/or rules for how to encode commands for the tags, modes for controlling antenna/driver block 651, secret keys, key pairs, and so on. In some of these embodiments, local memory 657 is provided as a database.

Some components of local block 610 typically treat data as analog, such as antenna/driver block 651. Other components such as local memory 657 typically treat data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link such as a USB, PCI, and so on. Local block 610 may include a local network connection 659 for communicating with communications network 680. Communications on the network can be secure, such as if they are encrypted or physically protected, or insecure if they are not encrypted or otherwise protected. Communications on the network can also, or additionally, be signed using an electronic signature, to ensure the integrity of the sender and the network.

There can be one or more remote component(s) 670. If more than one, they can be located at the same location, or in different locations. They can access each other and local block 610 via communications network 680, via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement a cryptographic or authentication function, similar to local processor 656.

Remote component(s) 670 can also include a remote memory 677. Remote memory 677 can be made in any way known in the art, such as was described with reference to local memory 657. Remote memory 677 may include a local database and/or a different database of a standards organization, such as one that can reference EPCs. Remote memory 677 may also contain information associated with commands, tag profiles, keys, or the like, similar to local memory 657.

Of the above-described elements, it may be advantageous to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by processing operational processing block 690.

Embodiments of an RFID reader system can be implemented as hardware, software, firmware, or any combination. Such systems may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
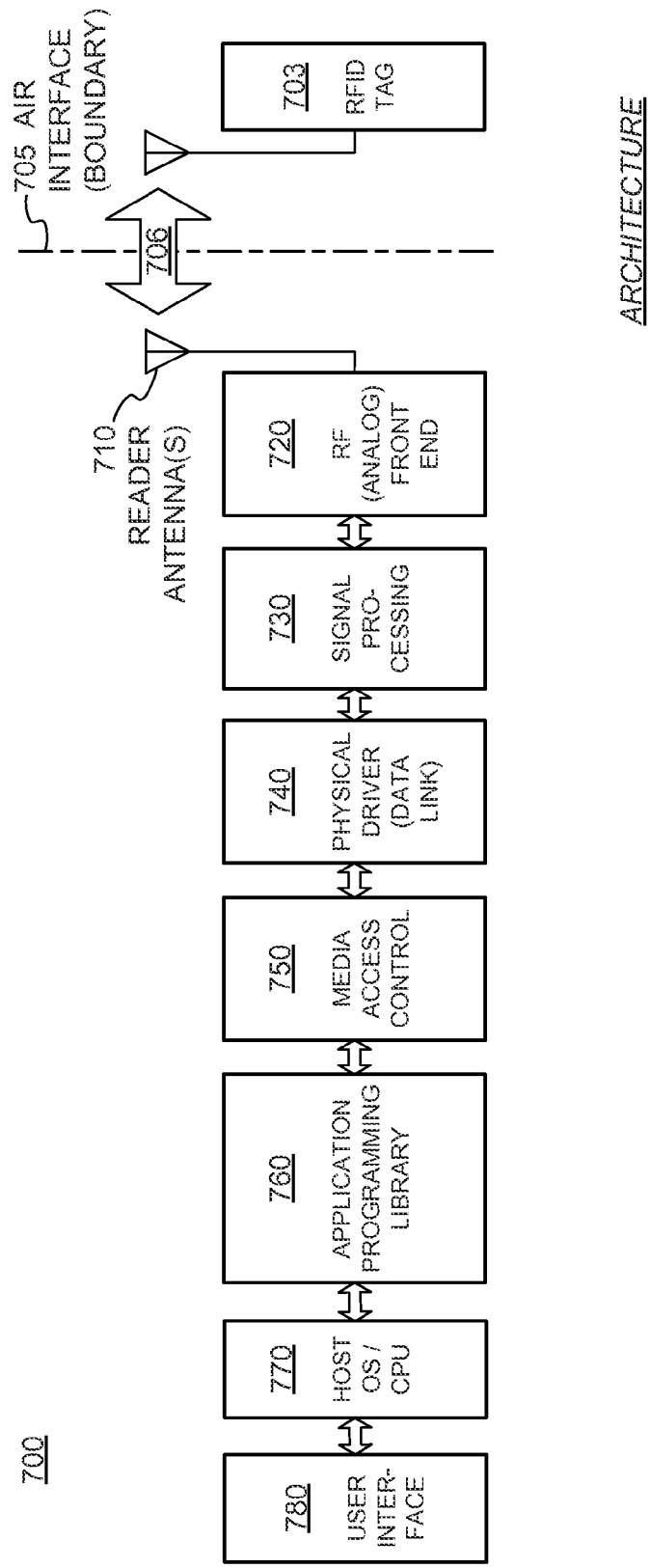
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components. Each of these modules may be implemented by itself, or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control module 750 exchanges packets of bits with physical driver module 740. Media access control module 750 can make decisions for sharing the medium of wireless communication, which in this case is the air interface but in other embodiments could be a wired interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular subdivision into modules need not be followed for creating embodiments. Furthermore, the features of the present disclosure can be performed either within a single one of the modules, or by a combination of them. In some embodiments RFID system 700 can be incorporated into another electronic device such as a point-of-sale terminal in a retail facility or a consumer device such as a mobile phone.

As mentioned previously, embodiments are directed to authenticating a tag, a reader, and/or a verification authority to determine the legitimacy of the tag, the object to which the tag is attached, the reader, and/or the verification authority. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and may be read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Figure 8:
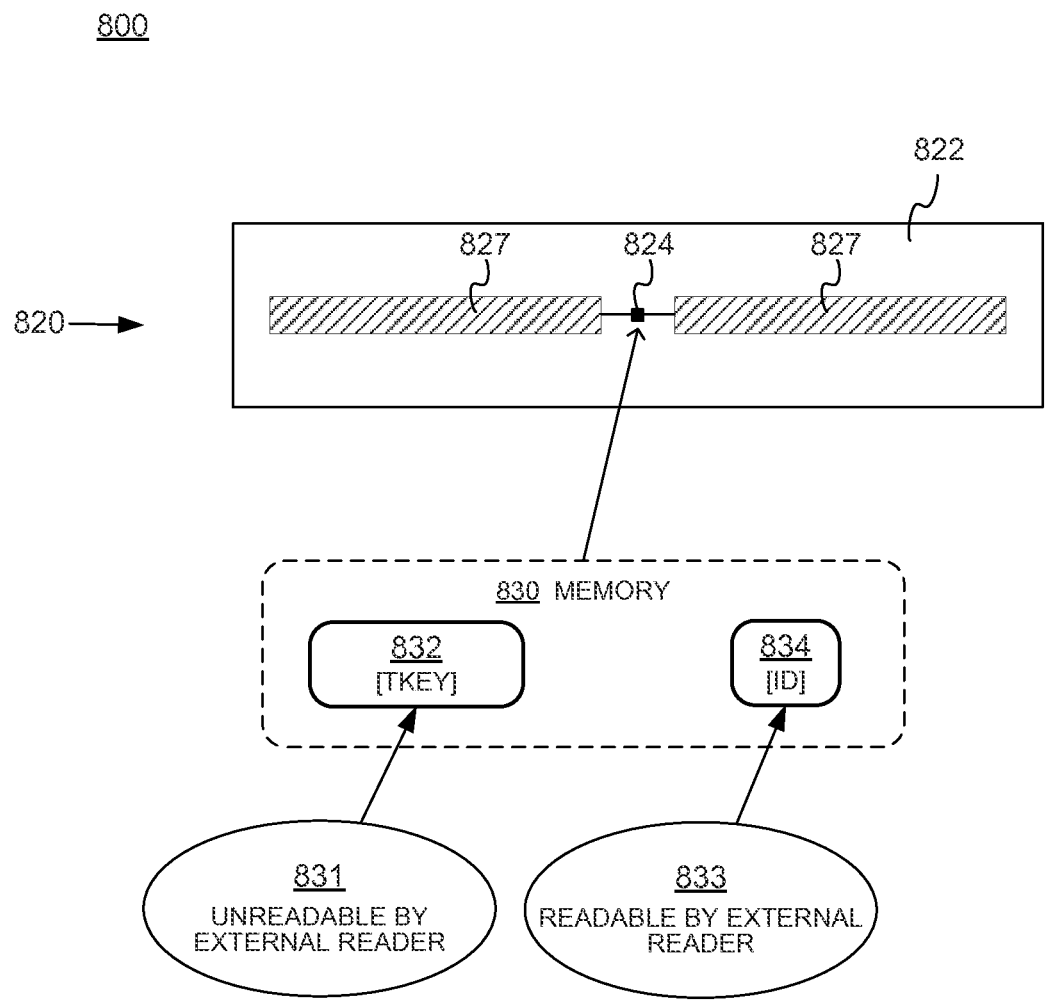
FIG. 8 illustrates an RFID tag configured to store an identifier and a key according to embodiments.

FIG. 8 illustrates a tag 820 configured to store a tag key (TKEY) 832 and an identifier (ID) 834 according to embodiments. Tag 820, similar to tag 220 depicted in FIG. 2, includes an IC 824 (similar to IC 224 in FIG. 2) with a tag memory 830 configured to store the TKEY 832, the ID 834, and any other suitable data. The TKEY 832, which is used to encrypt or decrypt messages sent from or received by the tag 820, is stored in a portion 831 of the tag memory 830 that is not readable by an external device such as a reader. In some embodiments, each individual RFID tag or group of tags may store a distinct tag key.

In contrast, the ID 834, which may identify the tag, an item to which the tag is attached, or both, is stored in a portion 833 of the tag memory 830 that is readable by an external device. For example, the ID 834 may include a tag identifier (TID), a key identifier (KID), a unique item identifier (UII), an electronic product code (EPC), a serialized trade identification number (SGTIN), or any other suitable identifier or identification code.

Figure 9:
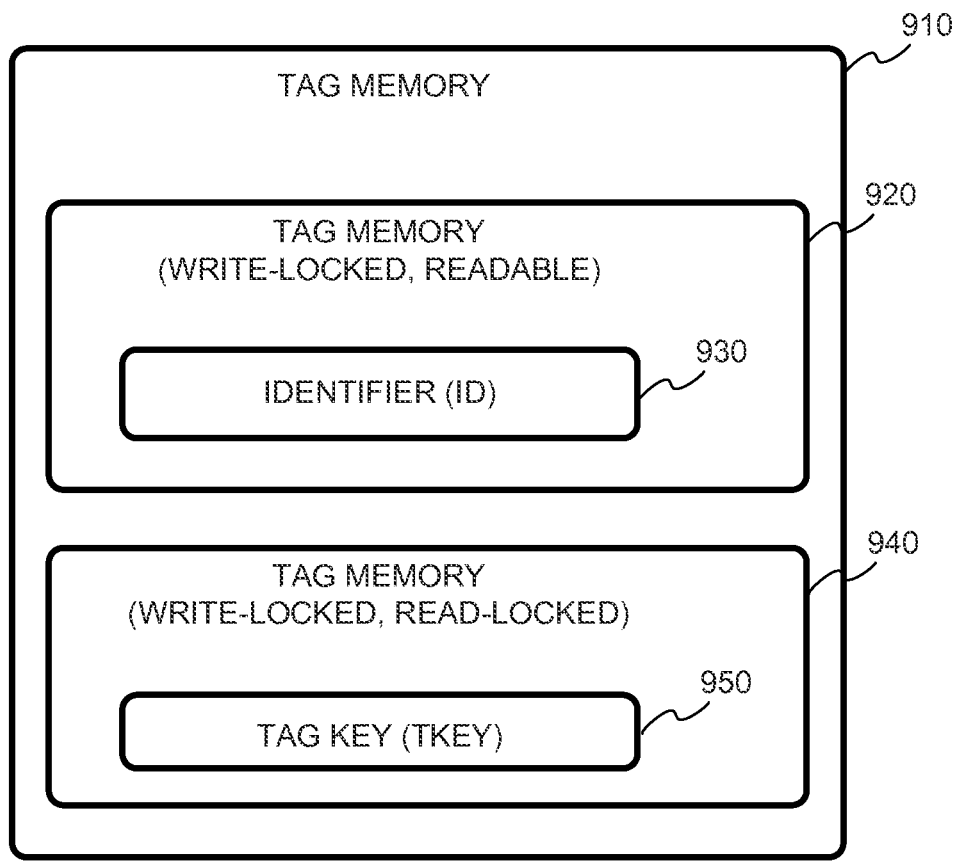
FIG. 9 illustrates a tag memory configuration according to one embodiment.

FIG. 9 depicts a configuration of a tag memory 910 according to one embodiment. Tag memory 910 is similar to tag memory 830 (FIG. 8), and includes at least two tag memory portions 920 and 940. Whereas in some embodiments the tag memory portions 920 and 940 may be portions of a single memory bank or physical memory, in other embodiments the portions 920 and 940 may each comprise separate memory banks, multiple memory banks, or multiple physical memories.

Tag memory portion 920, as with memory portion 833 (FIG. 8), is configured to store ID 930 (similar to ID 834 in FIG. 8) and be readable by an external device such as a reader. Tag memory portion 920 can be further configured to be unwriteable ("write-locked"), such that an external device cannot write to it, thereby preventing damage to or loss of the ID 930.

Similarly, tag memory portion 940 is akin to memory portion 831 (FIG. 8) in that it is configured to store TKEY 950 (similar to TKEY 832 in FIG. 8) and usually is unreadable by an external device. As with tag memory portion 920, tag memory portion 940 can also be configured to be unwriteable, thereby preventing damage to or loss of the TKEY 950. In some embodiments ID 930 and/or TKEY 950 may be encrypted.

At some point in time, ID 930 and TKEY 950 were written into tag memory portions 920 and 940, respectively. For example, a tag manufacturer may generate ID 930 and write it into tag memory portion 920 when the tag was manufactured or soon afterward. Similarly, the tag manufacturer may write the TKEY 950 into tag memory portion 940, either at the same time as ID 930 or at some other time. Alternatively, the tag supplier, verification authority, or even another entity can perform the writing. Although tag memory portions 920 and 940 are shown as unwriteable ("write-locked") in FIG. 9, the tag manufacturer or other entity may write the ID 930/TKEY 950 before rendering the tag memory portions unwriteable, or may write the data in some other way (e.g., via direct physical access to the memory portions).

In some embodiments, a reader may be able to reconfigure the tag in order to replace the ID 930 and/or TKEY 950 written in tag memory portions 920 and 940 with a different ID or TKEY. For example, the tag memory portions 920/940 may be configured to be unwriteable by readers without proper authorization but writeable by readers having proper authorization. Thus, an authorized reader may be able to write a new ID and/or TKEY into the tag memory portions 920/940.

FIG. 10A is a flow diagram 1000 illustrating the generation of cryptographically-secured data. Flow diagram 1000 begins with plaintext data 1002, which is the data to be cryptographically secured. In some embodiments, a hash function 1004 may first be used to generate an optional hashed data value 1006. A cryptographic operation 1008 may then be used to generate cryptographically-secured data 1010 from plaintext data 1002 and/or hashed data 1006. The cryptographic operation 1008 may implement any combination of suitable cryptographic techniques or algorithms, such as symmetric key algorithms (e.g., DES or AES), asymmetric key algorithms (e.g., RSA), stream ciphers, block ciphers, or any other suitable algorithm. When symmetric key algorithms are used, cryptographically-secured data 1010 may be generated using a secret key known to the sender of plaintext data 1002 and the intended recipient of cryptographically-secured data 1010. When asymmetric key algorithms are used, cryptographically-secured data 1010 may be generated using a private key known to the sender of plaintext data 1002 but not the intended recipient of cryptographically-secured data 1010.

Cryptographically-secured data 1010 may be cryptographically secured in any number of ways. In some embodiments, cryptographically-secured data 1010 includes encrypted data 1012, formed by encrypting plaintext data 1002 using cryptographic operation 1008. In other embodiments, cryptographically-secured data 1010 includes data 1014 and an electronic signature (ES) 1016 associated with data 1014 and used to allow a recipient to authenticate data 1014. Data 1014 may be plaintext (e.g., plaintext data 1002) or encrypted (e.g., encrypted data 1012). If encrypted, data 1014 may be processed to recover plaintext data 1002 as described below.

FIG. 10B is a flow diagram 1020 illustrating data recovery from encrypted data. Flow diagram 1020 may be performed by a recipient of cryptographically-secured data 1010, where cryptographically-secured data 1010 includes encrypted data 1012. The recipient may use a cryptographic operation 1022 to recover plaintext data 1002. Cryptographic operation 1022 may be the reverse of cryptographic operation 1008, and like cryptographic operation 1008 may implement any combination of suitable cryptographic techniques or algorithms. If cryptographic operation 1022 uses symmetric key algorithms, the recipient may use a known secret key to decrypt the encrypted data 1012, whereas if cryptographic operation 1022 uses asymmetric key algorithms, the recipient may use a known public key corresponding to the sender's private key to decrypt the encrypted data 1012.

As described above, cryptographically-secured data 1010 may include an electronic signature (ES) 1016 that allows a recipient to authenticate data 1014. Electronic signatures are cryptographic structures used to verify that a particular, signed message originated from a particular source and has not been altered. The sender of a signed message generates an electronic signature based on a sender key and the original message and "signs" the message by attaching the signature. A message recipient can then cryptographically process the attached signature to determine whether it corresponds to the received message. If so the message may be presumed authentic, and if not the message may be presumed counterfeit. Electronic signature 1016, if verified by a recipient of data 1014 provides assurance that data 1014 originated from a particular source and was not altered en route to the recipient.

Electronic signatures may be generated using symmetric and asymmetric cryptographic techniques. An electronic signature generated using symmetric cryptography may be known as a "message authentication code" (MAC). To generate a MAC for a message, a signatory (also referred to as a sender) uses a secret key and the message to generate the MAC. The sender may then send the message and the associated MAC to a recipient. The recipient in turn can use the same secret key to verify that the MAC corresponds to the message and that the sender knows the secret key. In some embodiments, the sender may instead only send the MAC to the recipient, and the recipient may recover the associated message from the MAC using the secret key.

An electronic signature generated using asymmetric cryptography may be known as a "digital signature" (DS). To generate a DS for a message, a signatory or sender uses the message and the private key from a private/public key pair to generate the DS. The private key and public key in the key pair are mathematically related to each other, and the signatory keeps the private key secret while making the public key available to others. The sender may then send both the message and the associated DS (referred to as a "digital signature with appendix") to a recipient. The recipient can then in turn use the public key to verify that the DS corresponds to the message and that the sender possesses the private key.

The term "electronic signature" or "ES" as used in this disclosure may refer to a MAC generated using symmetric cryptography or to a DS generated using asymmetric cryptography. A verified MAC or DS gives the recipient reason to believe that the message was created by a known sender, and that it was not altered in transit.

In some embodiments, digital signatures may be generated without using a separate hash, using a digital signature scheme with message recovery. In such embodiments, a DS may be generated directly from the data, and only the DS sent to the recipient. During verification, the recipient directly decrypts the DS with the public key to recover the data. Of course, other digital or electronic signature schemes may be used.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

Figure 10C:
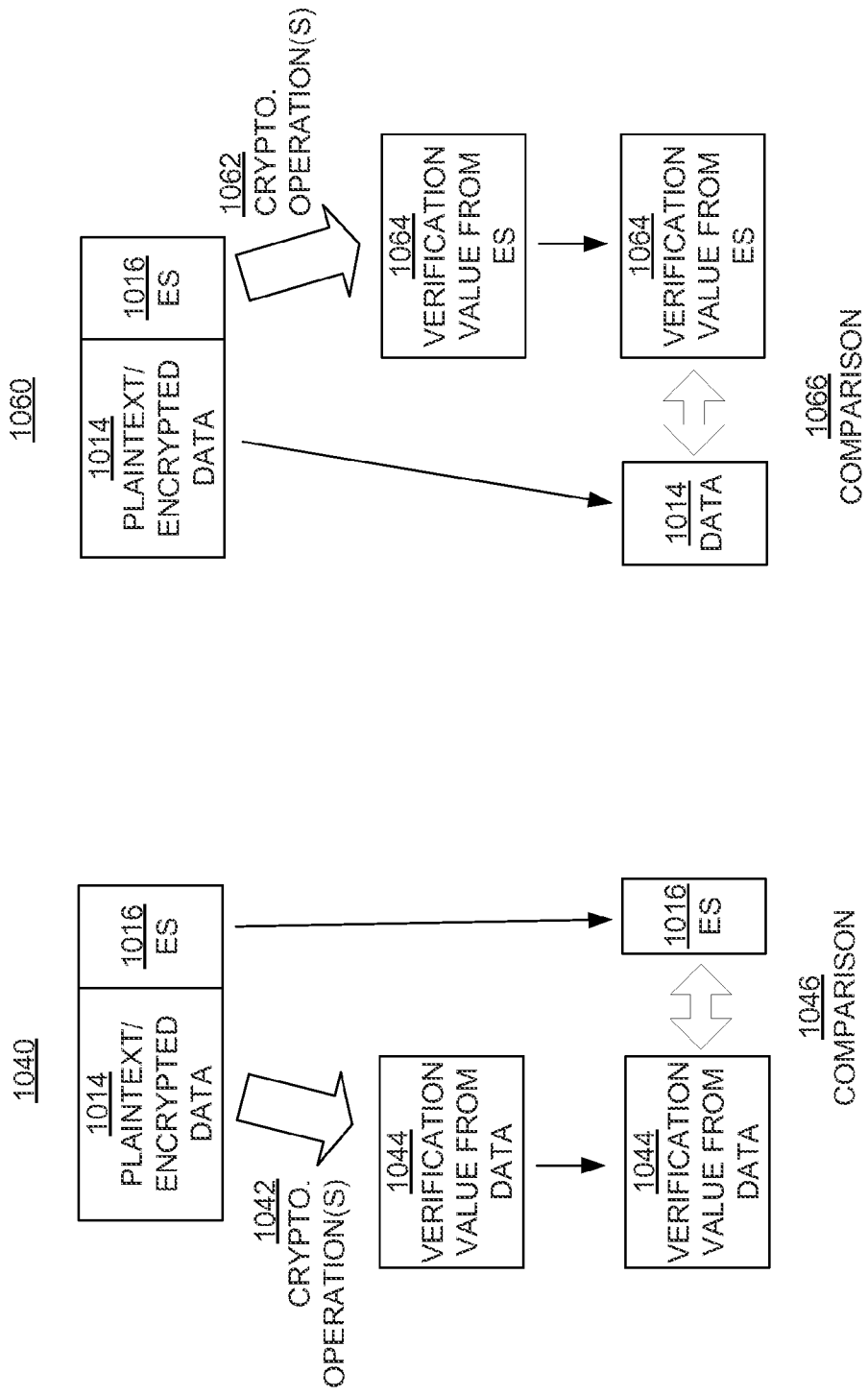
FIG. 10C shows processes for the verification of an electronic signature.

FIG. 10C shows processes 1040 and 1060 for the verification of an electronic signature 1016. In process 1040, suitable for electronic signatures generated using symmetric cryptographic techniques, a recipient of data 1014 (which may be plaintext, encrypted, or hashed data) and associated ES 1016 wishes to verify the authenticity of ES 1016 and/or data 1014. The recipient, which knows the secret key used to generate ES 1016, uses the secret key and one or more cryptographic operations 1042 to generate a verification value 1044 from data 1014. In some embodiments, verification value 1044 may be a new electronic signature computed based on data 1014 and the secret key known to the recipient. The recipient may then compare (1046) verification value 1044 and ES 1016. If the two correspond, then the recipient may deem data 1014 and/or ES 1016 authentic. If the two do not correspond, then the recipient may deem data 1014 and/or ES 1016 counterfeit.

In process 1060, a verification value 1064 is generated from ES 1016 instead of data 1014. Process 1060 may be suitable for electronic signatures generated using symmetric or asymmetric cryptographic techniques. A recipient of data 1014 and associated ES 1016 knows either the secret key used to generate ES 1016 or a public key corresponding to the private key used to generate ES 1016. The recipient then uses the known secret/public key and one or more cryptographic operations 1062 to generate verification value 1064 from ES 1016. Verification value 1064, if generated properly, may include at least some portion of the authentic data 1014. The recipient then compares (1066) verification value 1064 to data 1014. If the two correspond, then the recipient may deem data 1014 and/or ES 1016 authentic. If the two do not correspond, then the recipient may deem data 1014 and/or ES 1016 counterfeit.

Figure 11:
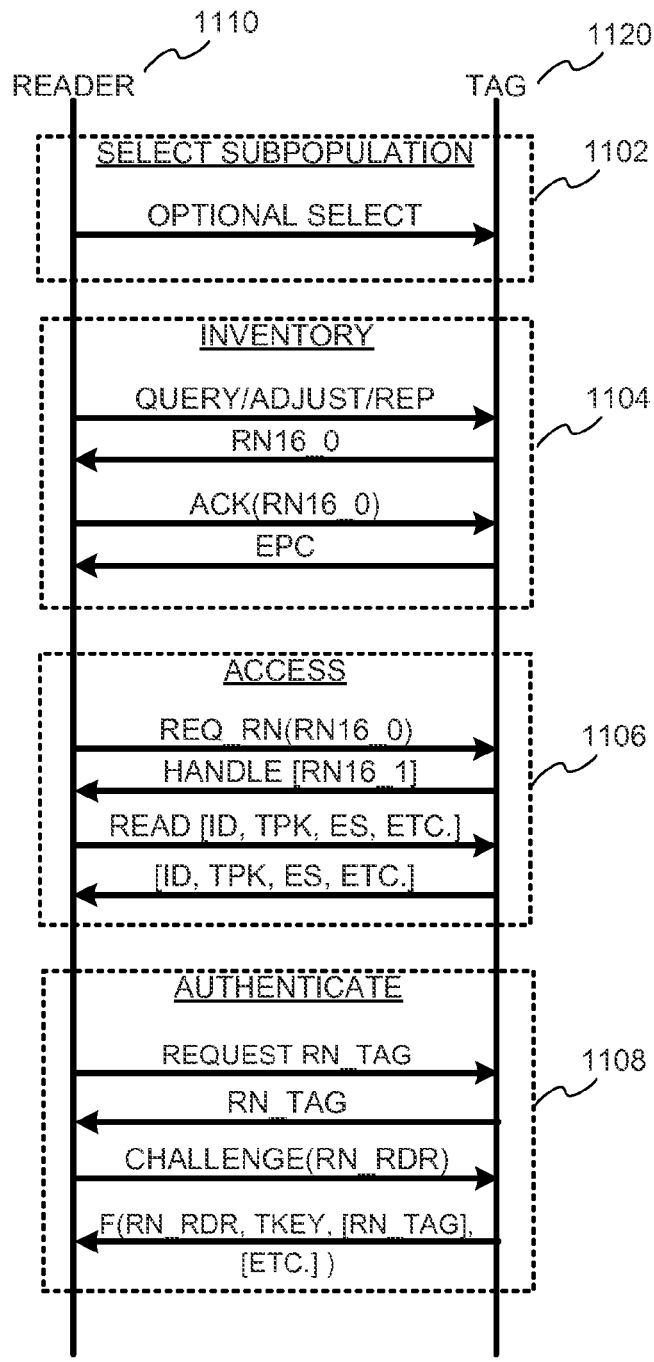
FIG. 11 illustrates exchanges between a reader and a tag according to embodiments.

FIG. 11 illustrates command-response exchanges 1100 between a reader 1110 and a tag 1120 according to embodiments. The sequence of signals proceeds downward chronologically (i.e., lower signals occur later), with signals from the reader 1110 to the tag 1120 indicated by arrows pointing right and signals from the tag 1120 to the reader 1110 indicated by arrows pointing left. Although the commands and responses in diagram 1100 of FIG. 11 assume that the reader 1110 and tag 1120 are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 11. Other orderings are possible; exchanges can be merged, enhanced, or eliminated; and the authentication can be spread across various operations between reader and tag.

The interactions between reader 1110 and tag 1120 in diagram 1100 begin with an optional tag subpopulation selection 1102, where the reader 1110 selects one or more tags from a tag population for inventorying and/or authentication. For example, the reader 1110 may broadcast a selection command that includes one or more criteria to the tag population. The criteria in the selection command may include one or more tag flag values, at least a portion of a tag identifier, and/or at least a portion of other data that can be stored on tags. Tags in the population that meet the one or more criteria, for example having tag flag values and/or stored data that match the tag flag value(s) and/or data specified in the selection command may be considered as "selected". In some embodiments, the selection command may be the Select command of the Gen2 Specification.

Reader 1110 then performs an inventory 1104 to singulate an individual tag from the tag population (or from within a subpopulation of selected tags, if the reader performed optional tag selection 1102). In some embodiments, the reader performs the inventory 1104 according to the Query-ACK sequence described in the Gen2 Specification. In the Gen2 Query-ACK sequence, a reader first transmits a Query/QueryAdj/QueryRep command. A tag that meets the criteria for responding may then reply with a 16-bit random/pseudorandom number RN16_0. Upon receipt of the RN16_0, the reader transmits an Acknowledge command (ACK) with the RN16_0 to the tag, which may then respond with its EPC.

After performing the inventory 1104, the reader then performs an access 1106 in order to access and read tag information from the tag singulated in inventory 1104. The tag may store (and the reader may access) an identifier ID, which may be the tag's EPC or another tag identifier. The tag may also store (and the reader may also access) a tag public key TPK corresponding to the TKEY if TKEY is a private key, an electronic signature ES associated with the ID, EPC, and/or TPK, and/or optionally one or more other parameters, such as a tag random number. The reader may begin the access 1106 by transmitting a REQ RN command with the RN16_0 received in inventory 1104, which requests a new random/pseudorandom number from the tag for use as a tag handle. The tag then responds with a RN16_1 handle. The reader then transmits a read request to read one of more of the ID, TPK, ES, and any other optional parameters. Upon receiving the read command sent by the reader, the tag transmits the requested information to the reader.

The reader then challenges the tag in an authentication step 1108. In the authentication step 1108, the reader may first optionally request a tag random number RN_TAG from the tag, which may be used to enhance the security of authentication step 1108. RN_TAG may have been previously stored in the tag, generated in situ, or generated in situ and then stored in the tag. In some embodiments the tag may generate RN_TAG using its TKEY or by reading a tag random number that was previously stored in tag memory. After generating RN_TAG, the tag transmits it to the reader. The tag may encrypt the RN_TAG before transmission. In some embodiments, the tag may generate an initial value (IV) based on RN_TAG and TKEY and transmit the IV to the reader in addition to or instead of RN_TAG.

The reader then transmits a challenge to the tag. A challenge is a message that contains a random number (which may be encrypted) and one or more cryptographic parameters. The challenge instructs a receiving entity, such as a tag or reader, to determine a cryptographic response based on the random number, the cryptographic parameter(s), and entity information such as an entity key, an entity identifier, or any other suitable entity information. The receiving entity may itself compute the cryptographic response using a cryptographic algorithm, or may have another entity compute and provide the cryptographic response to the receiving entity. The challenge may be determined based on the random number and/or an entity random number. A challenge may originate from another tag, a reader, or some other entity. In the situation described in diagram 1100, the challenge originates from the reader, includes a reader random number RN_RDR, and may also include the RN_TAG (or IV if used).

Upon receiving the challenge, the tag computes a response to the challenge based on the RN_RDR, the TKEY, other cryptographic parameters included in the challenge, the RN_TAG or IV, the tag handle (RN16_1), another tag random number such as the RN16_0, and/or any other suitable parameter. In some embodiments, the tag may use a tag random number different from the RN_TAG originally sent to the reader to generate the response. For example, the tag random number used to generate the response may be derived from RN_TAG based on some algorithm or may be entirely independent of RN_TAG. The tag then sends the computed response to the reader.

At this point the reader may be able to verify the tag's response using the RN_RDR, the RN_TAG/IV, the TPK, and/or any other previously-received or known parameter. For example, the reader may itself verify the tag's response, or the reader may send the challenge, the received tag response, and other information to a verification authority for verification. Some challenge-response variants do not use a tag random number or IV; others may include a command count or a message-authentication code; others may include the reader encrypting the random number in the reader-tag challenge; and yet others may include fewer or more steps than shown.

In some authentication embodiments a reader retrieves a tag's TPK, ES, and a tag-generated parameter, obtains a signing authority master public key associated with the ES via a network or other means, verifies the TPK, challenges the tag with the reader random number RN_RDR, receives the tag's response, and verifies the response using the TPK and the tag-generated parameter. In some embodiments the reader also uses an ID received from the tag to identify a signing authority or a particular master key. In some embodiments the reader may encrypt RN_RDR using the TPK, send the encrypted RN_RDR to the tag, receive a decrypted random number from tag, and verify the tag or tag response by comparing the RN_RDR with the received, decrypted random number. In other embodiments the reader may send RN_RDR to the tag, receive an encrypted random number from the tag, decrypt the received random number using the TPK, and verify the tag or tag response by comparing the sent RN_RDR with the decrypted, received random number.

In other authentication embodiments the reader may send a tag response to a challenge to a network-connected verification authority for verification as described below, without needing to use the tag TPK. The verification authority has some knowledge of the interrogated tag(s) (e.g., the tag key TKEY for one or more tags and/or the encryption algorithm(s) used by one or more tags). The verification authority may be known to the reader a priori, or the reader may query a network for the identity of an appropriate verification authority. In some embodiments, a tag may store the identity of a verification authority suitable for verification, and the reader may read the verification authority information from the tag. For example, referring to FIG. 11, after the reader has received a tag response in the authentication step 1108, the reader may send the tag response, the tag RN_TAG or IV (if any), the original reader-tag challenge, and the tag ID (received in access 1106) to the verification authority. The verification authority may then determine the tag key TKEY and/or the particular encryption algorithm used by that tag (e.g., by looking it up based on the received tag ID) and use the determined TKEY/encryption algorithm, along with the original reader-tag challenge and tag RN_TAG/IV (if any), to decrypt or verify the tag response. If the verification authority is able to decrypt/verify the tag response based on its knowledge of the tag (e.g., TKEY/encryption algorithm), then the verification authority confirms the tag response and thereby corroborates the tag's (or attached item's) authenticity.

In some embodiments, the verification authority may generate the challenge and send it to the reader for transmission to the tag. In this case, the reader may not transmit the original reader-tag challenge back to the verification authority along with the tag response, tag IV, and the tag ID, because the verification authority already knows the challenge used. Optionally, the verification authority may generate and provide a random number (e.g., the reader random number or an entirely different random number) for the reader to use to generate the challenge.

As described above, embodiments include different orderings of interactions between reader and tag. For example, in some embodiments the reader sends a challenge during tag selection 1102, preceding the access 1106, and the tag computes its response and stores the response in memory for subsequent reading by a reader. The tag's computation may also include a tag random number (e.g., RN_TAG, an IV, the tag handle, and/or RN16_0), and the tag may store the tag random number for subsequent access by the reader. Indeed, in embodiments where the challenge occurs during tag selection, and reading the response occurs during tag access, authentication 1108 need not exist, because its operations have been spread among select 1102 and access 1106. One reason a reader may choose to send the challenge with select 1102 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 1102. In some embodiments, a challenge that is transmitted to an individual tag may be an Authenticate command of the Gen2 Specification, and a challenge that is broadcast to multiple tags may be a Challenge command of the Gen2 Specification.

As mentioned above, the commands and signals in sequence 1100 do not have to be performed in the particular order shown, or even grouped as shown. The commands and signals may be separated, combined, or interspersed among each other. For example, an interrogated tag may transmit its tag ID with its response to a reader challenge, instead of providing its tag ID in inventory 1104 or access 1106. The tag may transmit its tag ID with its response as consecutive messages, or may concatenate the response with the tag ID, for example by prepending the response with the tag ID, appending the tag ID to the tag response, or otherwise combining the tag ID and the response in the same message. As another example, the reader may send the request for the tag random number during the optional tag selection 1102. Because the select signal in tag selection 1102 is broadcast to a population of tags, multiple tags may receive the reader's tag random number request. In response, each tag that receives the tag random number request may generate its own tag random number and then store the tag random number in tag memory. The reader may then subsequently read each tag (e.g., in access 1106) to retrieve the stored tag random number.

Whereas authenticate step 1108 in sequence 1100 includes a tag random number, in some embodiments step 1108 may not use or include a tag random number. In some embodiments, a tag authentication may include a command count (e.g., a count from the reader indicating the number of commands it has transmitted or a count from the tag indicating the number of commands it has received) and/or an electronic signature. Electronic signatures may include digital signatures generated via asymmetric cryptographic techniques and/or message authentication codes generated via symmetric cryptographic techniques. Other authentication steps may include more or fewer steps than the particular authenticate step 1108 shown in sequence 1100.

Figure 12:
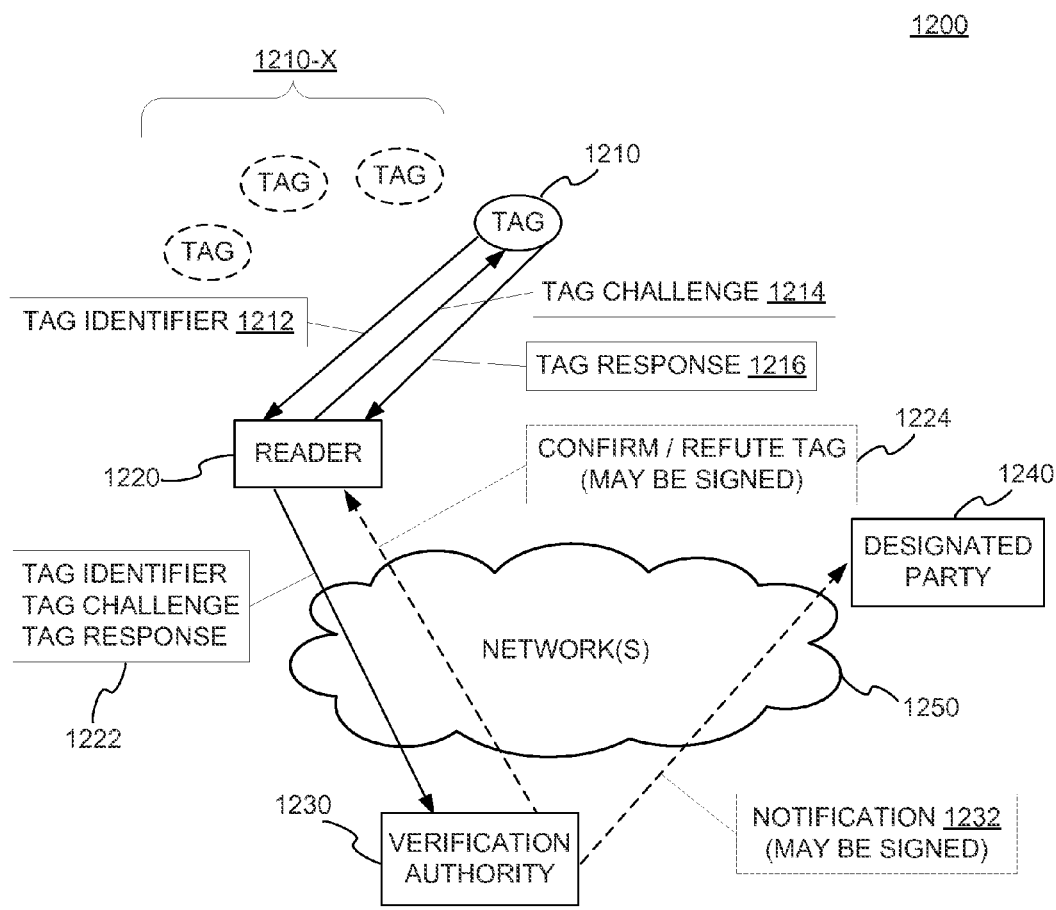
FIG. 12 is a diagram depicting interactions between an RFID reader, RFID tags, a verification authority, and a designated party according to embodiments.

FIG. 12 is a diagram 1200 depicting interactions between an RFID reader 1220, RFID tags 1210-X and 1210, a verification authority 1230, and a designated party 1240 according to one embodiment.

In diagram 1200, reader 1220 is communicating with a number of tags 1210-X and 1210. Reader 1220 has singulated tag 1210 and received a tag identifier 1212 (an EPC or other identifier such as ID 834/930 in FIGS. 8/9) from tag 1210. Reader 1220 then transmits a tag challenge 1214 (e.g., the challenge in authenticate step 1108, FIG. 11) to tag 1210. Tag 1210, which stores a secret (such as TKEY 832/950 in FIGS. 8/9), generates a tag response 1216 (e.g., the F( ) response in authenticate step 1108, FIG. 11) based on the stored secret, the tag challenge 1214, and optionally some tag-generated randomness. Tag 1210 then transmits its tag response 1216 to reader 1220.

Reader 1220 then transmits (1222) the tag identifier 1212, the tag challenge 1214, the tag response 1216, and optionally any indicators of tag-generated randomness (e.g., a tag IV) to a verification authority 1230 over one or more networks 1250. The verification authority 1230 stores or has access to information about the tag 1210, such as its stored secret and/or the encryption algorithm it uses. Verification authority 1230 then uses its information, the received tag identifier 1212, tag challenge 1214, and tag response 1216 to determine if the tag is authentic. For example, in one embodiment the verification authority 1230 may use the received tag identifier 1212 to find and access a local copy of the tag's stored secret/key, compute a response from the secret/key and the received tag challenge 1214, and compare the computed response with the actual, received tag response 1216. If the two responses match then the tag is authentic, and if the responses do not match then the tag is not authentic. In another embodiment the verification authority 1230 may use the received tag identifier 1212 to find and access a local copy of the tag's stored secret/key, use the secret/key to recover a challenge from the received tag response 1216, and compare the recovered challenge with the actual tag challenge 1214. If the two challenges match then the tag is authentic, and if the challenges do not match then the tag is not authentic. The verification authority 1230 may then optionally send a message 1224 to the reader 1220 via network(s) 1250 confirming or refuting the authenticity of the tag (or an item it is attached to).

In some embodiments, the message 1222 transmitted by the reader 1220 to the verification authority 1230 may include the physical location of reader 1220 when the challenge was issued to the tag 1210. The message 1222 may also include a reader identifier, and/or may be signed with a reader electronic signature.

The verification authority 1230 may transmit a notification 1232 to one or more designated parties 1240 via network(s) 1250 indicating whether the authenticity of tag 1210 was confirmed or refuted. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine.

In some embodiments, the verification authority 1230 may transmit a message to reader 1220 if the authenticity of the tag 1210 is confirmed or refuted. In other embodiments, the verification authority 1230 may only transmit a message if tag authenticity is confirmed, if it is refuted, or may not transmit a message to reader 1220 at all. The verification authority 1230 may also transmit a notification to a designated party or parties 1240 if the authenticity of the tag 1210 is confirmed or refuted, only if tag authenticity is confirmed, or only if tag authenticity is refuted.

In some embodiments message 1224 and notification 1232 may be electronically signed by the verification authority 1230. For example, the verification authority may compute an electronic signature based on the message/notification to be transmitted, a key or secret associated with the verification authority, and a cryptographic algorithm, and attach the computed electronic signature to the message/notification. When an entity (e.g., reader 1220 or designated party 1240) receives the message/notification, it may use the electronic signature to validate the message/notification by determining (a) if the message/notification actually came from the verification authority, and (b) if the message/notification was altered during transmission from the verification authority. In one embodiment, the receiving entity may perform these determinations using a public key (related to the private key/secret used by the verification authority to compute the electronic signature).

Figure 13:
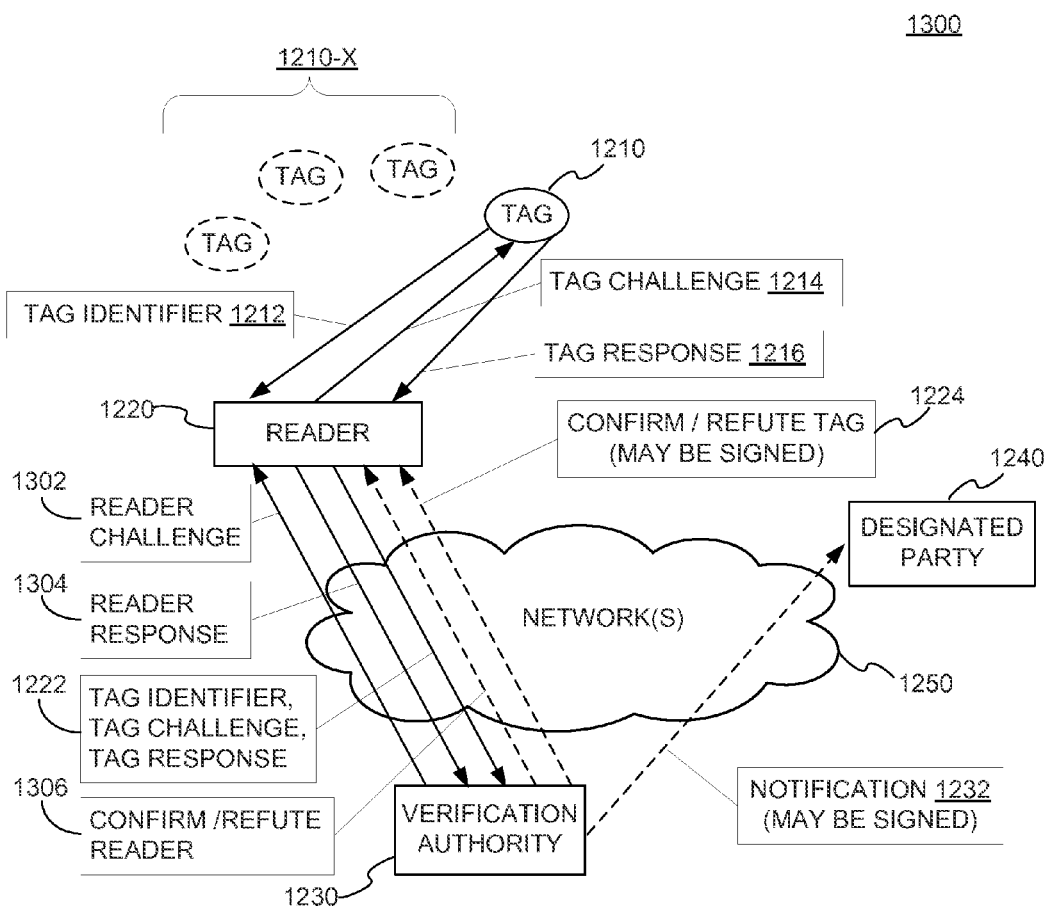
FIG. 13 is another diagram depicting interactions between an RFID reader, RFID tags, a verification authority, and a designated party according to embodiments.

FIG. 13 is a diagram 1300 depicting interactions between an RFID reader, RFID tags, a verification authority, and a designated party according to embodiments. Diagram 1300 is similar to diagram 1200, with similarly-numbered elements behaving similarly. Diagram 1300 also includes interactions for reader authentication. As mentioned above, in some embodiments the verification authority 1230 may need to authenticate the reader 1220. In these embodiments, the verification authority 1230 transmits a reader challenge 1302 to the reader 1220, either before the verification authority 1230 receives message 1222 or in response to receiving message 1222. In response, the reader 1220 generates a reader response 1304, similar to how tag 1210 generates tag response 1216 (i.e., by using a stored reader secret, the reader challenge, and optionally reader-generated randomness). The reader 1220 then transmits the reader response 1304 to the verification authority 1230, either before transmitting message 1222, after transmitting message 1222, or along with (or embedded in) message 1222. In some embodiments, the reader 1220 also transmits the physical location of the reader when the challenge was issued to the tag 1210 and/or a reader identifier (not shown) to the verification authority 1230. In some embodiments, the reader 1220 may sign its transmitted messages with a reader electronic signature, which may help further indicate that the reader is authentic.

In embodiments where the reader 1220 needs to be authenticated, the verification authority 1230 may wait to perform authentication on the received message 1222 until the reader 1220 has been authenticated. The verification authority 1230 may authenticate the reader 1220 in the same way it authenticates received message 1222. For example, the verification authority 1230 may store or have access to information about the reader 1220 such as its secret and/or the cryptographic algorithm it uses, and may use this information, the reader challenge 1302, and the reader response 1304 to determine whether the reader 1220 is authentic (e.g., by computing a response and comparing it to the reader response 1304).

After the verification authority 1230 has determined the authenticity of the reader 1220, it may transmit a reader confirmation/refutation message 1306 to the reader 1220. If the reader 1220 has also transmitted a message 1222 requesting authentication of tag 1210, the verification authority 1230 may perform the tag authentication as described above and transmit a tag confirmation/refutation message 1224 to the reader 1220. In some embodiments, instead of transmitting reader confirmation/refutation message 1306, the verification authority 1230 may also use the tag confirmation/refutation message 1224 to indicate reader confirmation/refutation. For example, if the reader 1220 is confirmed to be authentic, the verification authority 1230 may send the tag confirmation/refutation message 1224. If, on the other hand, the reader 1220 is not determined to be authentic, the verification authority 1230 may not send the tag confirmation/refutation message 1224 in response to message 1224. The verification authority 1230 may even transmit a false tag confirmation/refutation message 1224 if the reader 1220 is determined to not be authentic, and then optionally alert a third party (e.g., designated party 1240) of the not-authentic reader.

In some embodiments, if the verification authority 1230 transmits a reader confirmation/refutation message 1306 to the reader 1220, the verification authority 1230 may transmit a tag confirmation/refutation message if tag authenticity is confirmed, if it is refuted, or may not transmit a tag confirmation/refutation message to the reader 1220 at all.

Figure 14:
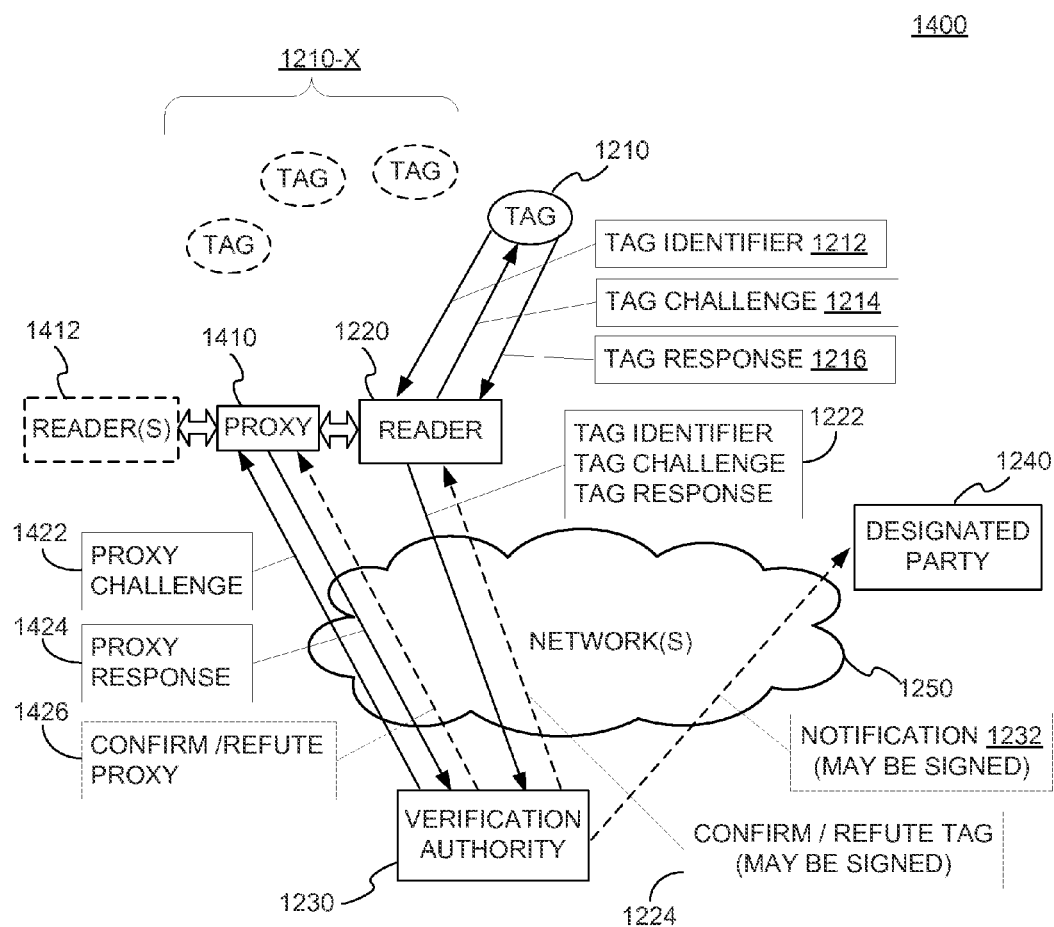
FIG. 14 is yet another diagram depicting interactions between an RFID reader, a reader proxy, RFID tags, a verification authority, and a designated party according to embodiments.

In some embodiments, a reader may be coupled to a proxy that provides authentication to a verification authority on its behalf, instead of directly authenticating itself. FIG. 14 is a diagram 1400 depicting interactions between an RFID reader, a reader proxy, RFID tags, a verification authority, and a designated party according to embodiments. Diagram 1400 is similar to diagram 1300, with similarly-numbered elements behaving similarly. However, in diagram 1400 reader 1220 indirectly authenticates itself to verification authority 1230 using proxy 1410. Proxy 1410, which may include a proxy application executing on a network appliance, a server, a host, a cloud, or a cloud server, is connected to reader 1220 via a wired or wireless connection and may also be connected to one or more other readers 1412. Proxy 1410 stores identifiers for reader 1220 and reader(s) 1412 and may also store a proxy key and/or one or more reader keys. Securing a proxy that stores multiple keys may be simpler than securing multiple readers, each storing a key. Moreover, it is easier to update and manage keys stored at a single location (e.g., a proxy) rather than multiple locations (e.g., individual readers).

When verification authority 1230 wishes to authenticate reader 1220, for example in response to receiving message 1222 or a reader authentication request from proxy 1410, verification authority 1230 may first authenticate proxy 1410 by transmitting a proxy challenge 1422, similar to reader challenge 1302, to proxy 1410. In response, proxy 1410 computes and sends back a proxy response 1424, similar to how reader 1220 generates reader response 1304. For example, the proxy response 1424 may be computed based on the proxy challenge 1422, one or more keys stored at proxy 1410, a proxy identifier, and optionally proxy-generated randomness. Proxy 1410 stores a proxy key and/or key(s) associated with reader 1220 and/or reader(s) 1412, and uses its stored key(s) to compute the proxy response 1424. In some embodiments, proxy 1410 identifies one or more readers that it wishes to authenticate to verification authority 1230 in the proxy response 1424. For example, proxy 1410 may include an identifier for reader 1220 and/or a physical location for reader 1220 in the proxy response 1424. The identifier may be any suitable reader identifier as described above, or may be a separate code generated by proxy 1410 identifying reader 1220. Proxy 1410 may also (or instead) identify readers for authentication in a separate message sent before, concurrently with, or after the proxy response 1424. In some embodiments, proxy 1410 may further sign its transmitted messages with a proxy electronic signature, which may help further indicated that the proxy is legitimate.

Verification authority 1230 then attempts to authenticate the proxy response 1424, similar to how it authenticates received message 1304. For example, verification authority 1230 may store or have access to information about the proxy 1410 such as its stored secret(s) and/or the cryptographic algorithm it uses, and may use this information, the proxy challenge 1422, and the proxy response 1424 to determine whether the proxy 1410 is authentic (e.g., by computing a response and comparing it to the proxy response 1424). If verification authority 1230 verifies that the proxy 1410 is authentic and the proxy 1410 has identified one or more readers for authentication (e.g., in the proxy response 1424 or in a separate message), verification authority 1230 may treat those identified readers as authentic and comply with tag authentication requests from those readers.

Subsequently, verification authority 1230 may transmit an optional proxy confirmation/refutation message 1426 to proxy 1410 upon verifying (or failing to verify) the authenticity of the proxy response 1424. In some embodiments, verification authority 1230 may not transmit message 1426 if it fails to verify proxy response 1424, or may not transmit message 1426 even if proxy response 1424 is verified.

In some embodiments, proxy 1410 may then notify reader 1220 that it has been identified to verification authority 1230 for authentication. Proxy 1410 may notify reader 1220 in response to generating and/or sending proxy response 1424 or when message 1426 is received from verification authority 1230. In some embodiments, proxy 1410 may not notify reader 1220 that it has been identified to verification authority 1230 for authentication, and merely have reader 1220 contact verification authority 1230 directly for tag authentication. Reader 1220 may then transmit message 1222 to verification authority 1230 for authentication as described above.

In some embodiments, only the proxy 1410 or the reader 1220 may communicate with verification authority 1230. For example, reader 1220 may receive the proxy challenge 1422 and forward it to proxy 1410. Proxy 1410 may then compute proxy response 1424 and send it to reader 1220, which then transmits proxy response 1424 to verification authority 1230. Similarly, if proxy 1410 communicates with verification authority 1230 for authentication, reader 1220 may generate message 1222 and forward it to proxy 1410 for transmission to verification authority 1230. In these situations, message 1222 may be combined with proxy response 1424 in the same message to verification authority 1230. If proxy 1410 communicates with verification authority 1230 whereas reader 1220 does not, then proxy 1410 may store message 1222 along with other messages containing authenticating information for multiple tags and/or multiple readers (e.g., proxy response 1424) before transmitting one or more of the messages to verification authority 1230. In this embodiment, proxy 1410 may configure its transmission to verification authority 1230 to take advantage of batch transmission.

While proxy 1410 is depicted as a separate entity in FIG. 14, in some embodiments, proxy 1410 may be integrated into reader 1220 and/or reader(s) 1412. For example, proxy 1410 may be a proxy application that is executed at reader 1220 and/or reader(s) 1412. Similarly, while proxy 1410 is described above as providing indirect authentication for reader 1220 and/or reader(s) 1412, proxy 1410 may also have additional control over the operation of reader 1220 and/or reader(s) 1412. For example, proxy 1410 may be configured to allow reader 1220 and/or reader(s) 1412 to operate only in certain geographical locations, at specific times, if proxy 1410 receives a particular enabling input from a third party, in accordance with some particular operating policy, or if any other suitable criteria are met (or not met).

In diagrams 1200, 1300, and 1400, the verification authority 1230 may transmit notification 1232 to one or more designated parties 1240 via network(s) 1250 indicating whether the authenticity of reader 1220, proxy 1230, and/or tag 1210 was confirmed or refuted. As described in the example above, a pharmaceutical distributor using an RFID-enabled reader to interrogate a case of medicine may use a verification authority, which may send the reply to a designated party such as the distributor's security office or, in some instances, directly to the police in the event of counterfeit medicine. The verification authority 1230 may transmit a notification to a designated party or parties 1240 if authenticity is confirmed or refuted, only if authenticity is confirmed, or only if authenticity is refuted.

As shown in diagrams 1200, 1300, and 1400, the verification authority 1230 communicates with the reader 1220, the proxy 1230, and the designated party 1240 over one or more networks 1250. The network(s) 1250 may be available in real-time, meaning that an entity can engage with another entity on the network 1250 on a message-by-message basis, or the network(s) 1250 may be non-real-time, meaning that an entity stores or buffers its messages and later transmits them to other entities when the network is available. Of course, entities may also store and later transmit messages to other entities on a network that is available in real-time.

In some embodiments, the reader 1220 may store responses from multiple tags before transmitting one or more of the responses to the verification authority 1230. In this embodiment, the reader 1220 may configure its transmissions to the verification authority 1230 to take advantage of batch transmission. If the reader 1220 stores responses from multiple tags to a single challenge, the reader 1220 may first transmit a subset (one or more) of the stored responses but only one copy of the challenge to the verification authority 1230. Subsequently, the reader 1220 may transmit more of the stored responses, but no further challenges, to the verification authority 1230.

Figure 15:
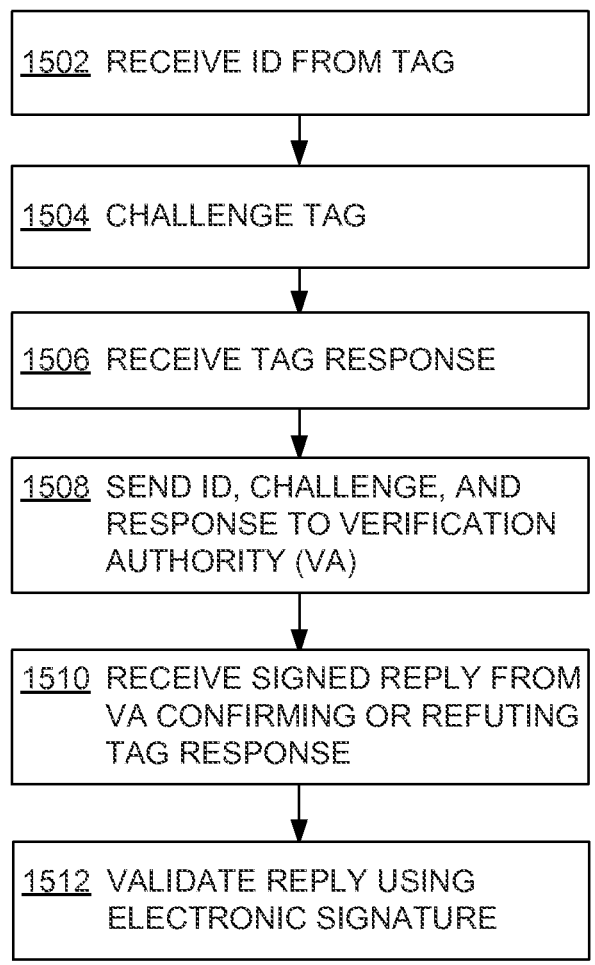
FIG. 15 is a flowchart illustrating a process for a reader authenticating a tag according to embodiments.

FIG. 15 is a flowchart illustrating a process 1500 for tag authentication according to embodiments. In step 1502, a reader (e.g., reader 1220 in FIG. 12) receives an identifier ID (e.g., ID 834/930 in FIGS. 8/9) from a tag (e.g., tag 1210 in FIG. 12). The reader then challenges the tag at step 1504 by transmitting a challenge to the tag (e.g., as part of the authenticate step 1108 in FIG. 11). In step 1506, the reader receives a response from the tag. The reader then sends the ID, challenge, and response to a verification authority (e.g., verification authority 1230 in FIG. 12) in step 1508. In step 1510, the reader receives an electronically-signed reply from the verification authority confirming or refuting the tag response. Finally, in step 1512, the reader validates the reply received from the verification authority by checking the reply's electronic signature, as described above in relation to FIG. 12.

Figure 16:
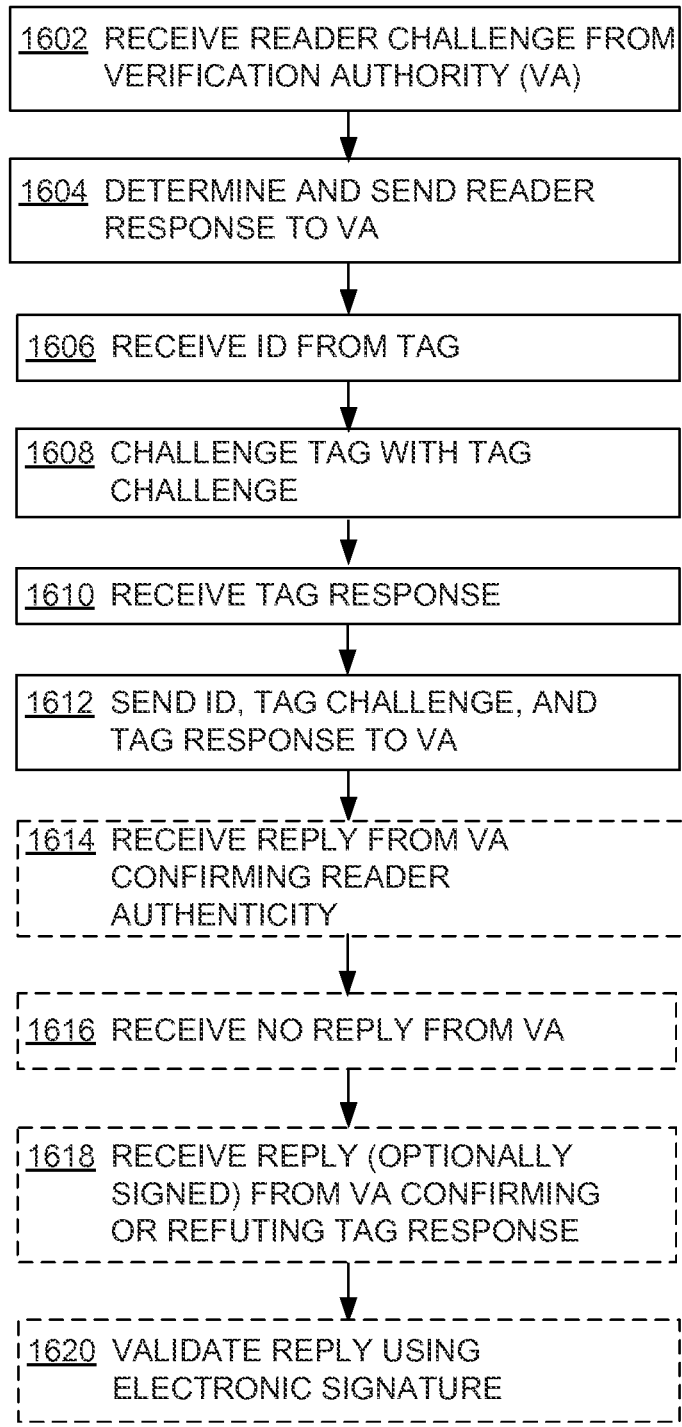
FIG. 16 is a flowchart illustrating a process for reader and tag authentication according to embodiments.

FIG. 16 is a flowchart illustrating a process 1600 for tag authentication according to embodiments. In step 1602, a reader (e.g., reader 1220 in FIG. 13) receives a reader challenge (e.g., reader challenge 1302 in FIG. 13) from a verification authority (e.g., verification authority 1230 in FIG. 13). In step 1604, the reader determines a reader response (e.g., reader response 1304 in FIG. 13) and transmits it to the verification authority. In step 1606, the reader receives an identifier ID (e.g., ID 834/930 in FIGS. 8/9) from a tag (e.g., tag 1210 in FIG. 13). The reader then challenges the tag at step 1608 by transmitting a tag challenge (e.g., as part of the authenticate step 1108 in FIG. 11). In step 1610, the reader receives a response from the tag. The reader then sends the tag ID, tag challenge, and tag response to the verification authority in step 1612. The reader may optionally receive a reply from the verification authority in step 1614 confirming reader authenticity, or may optionally not receive a reply from the verification authority confirming reader authenticity (step 1616). In step 1618 the reader may receive an electronically-signed reply from the verification authority confirming or refuting the tag response (note that, as described above, the VA may or may not send the reply if the reader is not authentic). Finally, in optional step 1620, the reader may validate the reply received from the verification authority by checking the reply's electronic signature, as described above in relation to FIG. 13.

Figure 17:
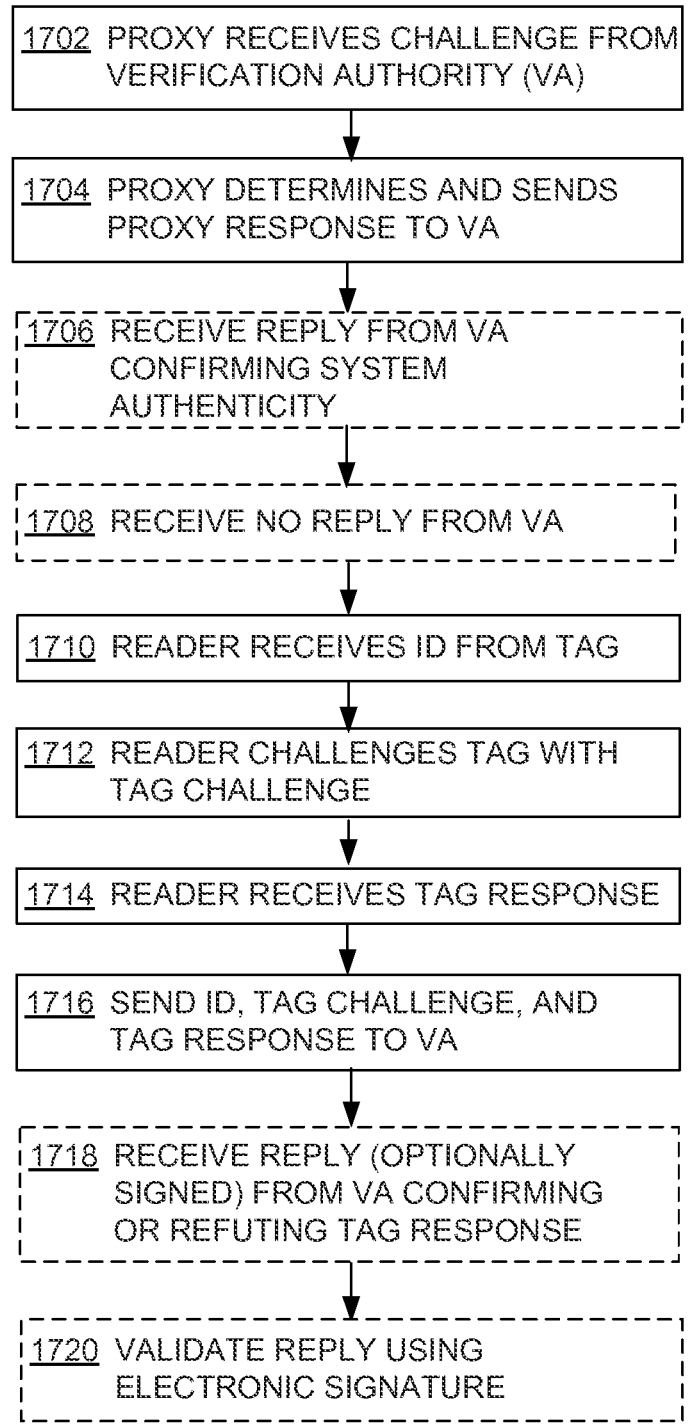
FIG. 17 is a flowchart illustrating a process for reader proxy and tag authentication according to embodiments.

FIG. 17 is a flowchart illustrating a process 1700 for tag authentication according to embodiments. In step 1702, a reader proxy (e.g., proxy 1410 in FIG. 14) receives a proxy challenge (e.g., proxy challenge 1422 in FIG. 14) from a verification authority (e.g., verification authority 1230 in FIG. 14). In step 1704, the proxy determines a proxy response (e.g., proxy response 1424 in FIG. 14) and transmits it to the verification authority. The proxy may optionally receive a reply from the verification authority in step 1706 confirming reader authenticity, or may optionally not receive a reply from the verification authority confirming reader authenticity (step 1708). In step 1710, a reader receives an identifier ID (e.g., ID 834/930 in FIGS. 8/9) from a tag (e.g., tag 1210 in FIG. 14). The reader then challenges the tag at step 1712 by transmitting a tag challenge (e.g., as part of the authenticate step 1108 in FIG. 11). In step 1714, the reader receives a response from the tag. The reader then sends the tag ID, tag challenge, and tag response to the verification authority in step 1716. In step 1718 the reader may receive an electronically-signed reply from the verification authority confirming or refuting the tag response (note that, as described above, the VA may or may not send the reply if the reader or proxy is not authentic). Finally, in optional step 1720, the reader may validate the reply received from the verification authority by checking the reply's electronic signature, as described above in relation to FIG. 13.

The steps described in processes 1500, 1600, and 1700 are for illustrative purposes only. RFID tag and reader authentication by a verification authority may be implemented using additional or fewer steps and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a verification authority to authenticate Radio Frequency Identification (RFID) tags, the method comprising:
   transmitting a challenge to a proxy, the proxy configured to authenticate a plurality of RFID readers to the verification authority;
   receiving at least a proxy response;
   verifying the proxy response based on at least the proxy challenge and a proxy key;
   in response to verifying the proxy response, considering the plurality of RFID readers authenticated;
   receiving a tag-authentication request from a first RFID reader, the tag-authentication request including at least a tag identifier and a tag response;
   determining the first RFID reader is one of the plurality of authenticated RFID readers;
   verifying the tag response; and
   transmitting a tag-authenticity message based on the verification of the tag response.

2. The method of claim 1, further comprising transmitting the proxy challenge in response to receiving a reader-authentication request from the proxy.

3. The method of claim 1, further comprising transmitting the proxy challenge in response to receiving the tag-authentication request from the first RFID reader.

4. The method of claim 1, further comprising:
- receiving another tag-authentication request from a second RFID reader, the other tag-authentication request including at least another tag identifier and another tag response;
- determining the second RFID reader is one of the plurality of authenticated RFID readers;
- verifying the other tag response; and
- transmitting another tag-authenticity message based on the verification of the other tag response.

5. The method of claim 1, further comprising receiving, from the proxy, at least one of:
- a proxy identifier;
- at least one identifier associated with the plurality of RFID readers; and
- a physical location associated with the plurality of RFID readers.

6. The method of claim 1, wherein the proxy is an application configured to run on the first RFID reader.

7. The method of claim 1, wherein:
- verifying the tag response comprises determining that the tag response is not authentic; and
- the tag-authenticity message refutes an authenticity of the tag response.

8. The method of claim 1, further comprising transmitting a notification to a designated party in response to at least one of determining that a received proxy response is not authentic and determining that a received tag response is not authentic.

9. A method for a proxy to authenticate Radio Frequency Identification (RFID) readers to a verification authority, the method comprising:
- determining that a plurality of RFID readers are to be authenticated to the verification authority;
- transmitting a reader-authentication request to the verification authority;
- receiving a proxy challenge from the verification authority;
- determining a proxy response based on the proxy challenge and a proxy key;
- transmitting the proxy response to the verification authority; and
- transmitting at least one identifier associated with the RFID readers to the verification authority to authenticate the RFID readers to the verification authority.

10. The method of claim 9, wherein the proxy is an application configured to run on one of the RFID readers.

11. The method of claim 9, further comprising transmitting the at least one identifier in a cryptographically-secured message.

12. The method of claim 9, further comprising transmitting the at least one identifier with at least one of the reader-authentication request and the proxy response.

13. The method of claim 9, wherein the reader-authentication request includes at least one of a proxy identifier and a physical location associated with the RFID readers.

14. A method for a Radio Frequency Identification (RFID) system having a plurality of RFID readers and a proxy coupled to the RFID readers to authenticate tags via a verification authority, the method comprising:
- receiving a challenge for the proxy from the verification authority;
- determining, at the proxy, a proxy response based on the proxy challenge and a proxy key;
- transmitting the proxy response to the verification authority;
- identifying the RFID readers to the verification authority to authenticate the RFID readers to the verification authority;
- transmitting, from a first one of the authenticated RFID readers, a tag-authentication request including at least a tag identifier and a tag response to the verification authority; and
- receiving a tag-authenticity message from the verification authority indicating whether the tag response is authentic.

15. The method of claim 14, wherein the proxy is an application configured to run on at least one of:
- one of the RFID readers,
- a network appliance,
- a server,
- a host,
- a cloud, and
- a cloud server.

16. The method of claim 14, further comprising identifying the RFID readers by transmitting at least one identifier associated with the RFID readers to the verification authority.

17. The method of claim 16, wherein the at least one identifier is cryptographically secured.

18. The method of claim 14, further comprising transmitting a reader-authentication request to the verification authority.

19. The method of claim 18, further comprising transmitting at least one identifier associated with the RFID readers with at least one of the reader-authentication request and the proxy response.

20. The method of claim 18, wherein the reader-authentication request includes at least one of a proxy identifier and a physical location associated with the RFID readers.

* * * * *

UNITED STATES PATENT AND TRADEMARK OFFICE
CERTIFICATE OF CORRECTION

PATENT NO.      : 9,690,949 B1
APPLICATION NO. : 14/444854
DATED           : June 27, 2017
INVENTOR(S)     : Christopher J. Diorio et al.

It is certified that error appears in the above-identified patent and that said Letters Patent is hereby corrected as shown below:

In the Specification

In Column 4, Line 8, Delete "serialized trade identification number (SGTIN)" and insert -- "serialized global trade identification number (SGTIN)." --, therefor.
In Column 14, Lines 45-46, Delete "serialized trade identification number (SGTIN)" and insert -- "serialized global trade identification number (SGTIN)." --, therefor.
In Column 18, Line 33, Delete "REQ RN" and insert -- REQ_RN --, therefor.
In Column 27, Line 14, Delete "and or" and insert -- and/or --, therefor.

Signed and Sealed this
Eighth Day of May, 2018

Andrei Iancu
*Director of the United States Patent and Trademark Office*